(12) United States Patent
Tanaka et al.

(10) Patent No.: US 7,209,260 B1
(45) Date of Patent: Apr. 24, 2007

(54) IMAGE PROCESSING APPARATUS

(75) Inventors: Hiroshi Tanaka, Yamatokoriyama (JP); Yoshiyuki Nakai, Nara (JP); Toru Adachi, Yamatokoriyama (JP); Keiji Nakamura, Nara (JP); Tokiyuki Okano, Yamatokoriyama (JP); Kohsuke Harada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 726 days.

(21) Appl. No.: 09/618,537

(22) Filed: Jul. 18, 2000

(30) Foreign Application Priority Data

Jul. 19, 1999 (JP) ............................... P11-204826

(51) Int. Cl.
*G06K 15/02* (2006.01)
(52) U.S. Cl. ...................... 358/1.2; 358/1.16; 358/451; 382/258; 382/298; 382/300
(58) Field of Classification Search ................. 358/1.2, 358/1.16, 401, 444, 451; 382/300, 298, 258
See application file for complete search history.

(56) References Cited

U.S. PATENT DOCUMENTS 5,764,370 A * 6/1998 Amakawa et al. ........... 382/298
5,774,234 A * 6/1998 Miyamoto et al. .......... 358/451

(Continued)

FOREIGN PATENT DOCUMENTS

JP           51-35215         3/1976

(Continued)

OTHER PUBLICATIONS

Office Action from Japan Patent Office for corresponding Japanese Application No. 11-204826 mailed Oct. 28, 2003 (2 pp.) (no translation).

(Continued)

*Primary Examiner*—Douglas Q. Tran
*Assistant Examiner*—Chan S. Park
(74) *Attorney, Agent, or Firm*—Edwards Angell Palmer & Dodge LLP; David G. Conlin; Mark D. Russett

(57) ABSTRACT

The object of the present invention is to use the same FIFO line memory for both enlargement and reduction during variable-magnification processing in the scan direction, allowing reduction in circuit board area, reduction in power consumption, and reduction in cost, and to provide an image processing apparatus that allows variable-magnification processing to be carried out such that the speed of a scanning unit that captures image data during variable-magnification processing in the cross-scan direction is constant. During processing to enlarge an image in the scan direction, image data travels from CCD circuit board, passing through gate b of selector, is written to and read from FIFO memory, and from gate b of selector is written to memory provided at variable magnification unit. At variable magnification unit, image data is read from memory a plurality of times in correspondence to enlargement ratio, changing the magnification of the image data. Furthermore, image data is output through gate a of selector to LSU unit. During processing to reduce an image, image data travels from CCD circuit board, passing through gate a of selector, is input to variable magnification unit where it is subjected to variable-magnification processing, passes through gate a of selector, is written to and read from FIFO memory, passes through gate b of selector, and is output to LSU unit.

5 Claims, 12 Drawing Sheets

U.S. PATENT DOCUMENTS 6,377,360 B1 * 4/2002 Hattori .................. 358/1.5
6,388,711 B1 * 5/2002 Han et al. .................. 348/441
6,486,971 B1 * 11/2002 Kawamoto .................. 358/1.2

FOREIGN PATENT DOCUMENTS

| JP | 63-48064 | 2/1988 |
|----|----------|--------|
| JP | 63-82168 | 4/1988 |
| JP | 5-124263 | 5/1993 |
| JP | 7-23214 | 1/1995 |
| JP | 9-312759 | 12/1997 |
| JP | 10-240923 | 9/1998 |
| JP | 11-55500 | 2/1999 |

OTHER PUBLICATIONS

Notification of Reason of Refusal dated Sep. 7, 2004, Japanese Patent Application No. 11-204826.

* cited by examiner

DURING ENLARGEMENT

DURING REDUCTION

IMAGE PROCESSING APPARATUS

BACKGROUND OF THE INVENTION

1. Field of the Invention

The present invention relates to image processing apparatuses such as digital copiers which are provided with the capability of carrying out variable magnification of image data.

2. Description of the Related Art

Among the image processing capabilities implemented in digital copiers, which represent one type of conventional image processing apparatus, is the capability of carrying out variable magnification. This variable-magnification capability is such that processing is carried out independently in the scan and cross-scan directions.

FIG. 11 is a block diagram showing the sequence of operations during variable-magnification processing in the scan direction. At multivalue image processing section 402 of main image processing circuit board 400 in FIG. 2, to be described below, image data input from CCD circuit board 300 is acquired by enlarging first-in-first-out-type line memory("first-in-first-out" is hereinafter referred to as "FIFO") 71, and enlargement of the acquired image data is carried out at variable magnification unit 72, during which image data may simply be duplicated, or interpolative processing wherein new pixel data is created from pixel data at two adjacent points may be carried out, or the like. Furthermore, reduction of acquired image data is carried out at variable magnification unit 72, during which image data may be read intermittently, skipping of data occurring in units of pixels, or interpolative processing wherein new pixel data is created from pixel data at two adjacent points may be carried out, or the like, with the acquired image data being written to reducing FIFO line memory 73. Moreover, image data on which enlargement or reduction has been carried out is output to LSU 46 and printing on recording media is carried out.

FIG. 12A is a block diagram showing the sequence of operations during variable-magnification processing in the cross-scan direction. By varying the speeds of travel of first scanning unit 40a and second scanning unit 40b, which comprise reflecting mirrors 42a through 42c of digital copier 30 at FIG. 1, to be described below, the number of lines of image data input to photoelectric conversion element (hereinafter referred to as "CCD") 44 is increased or decreased, variable-magnification processing being carried out on image data as a result of alteration in the number of lines in the original input at multivalue image processing section 402 of FIG. 2, and the image data which has been subjected to variable-magnification processing is output to laser write unit (hereinafter referred to as "LSU") 46, and printing is carried out on recording media. If, for example as shown in FIG. 12B, control is carried out such that image data is sent to multivalue image processing section 402 with the same line having been acquired twice, an image of magnification 2× will be obtained. If, on the other hand as shown at FIG. 12C, acquisition with respect to a plurality of lines occurs once every other line, an image of magnification ½× will be obtained.

However, in the foregoing conventional processing, when variable-magnification processing is carried out in the scan direction, processing of image data has been carried out in the following order:

image data input→enlarging FIFO line memory 71→variable magnification unit 72→reducing FIFO line memory 73→image data output.

There has been separate control of write signals and read signals with respect to respective FIFO line memories. For this reason, two FIFO line memories—an enlarging FIFO line memory 71 and a reducing FIFO line memory 73—have been necessary. Furthermore, to vary speed of travel of the scanning unit that captures image data in the cross-scan direction in accordance with magnification ratio, a motor capable of carrying out variable speed control has been necessary and the task of writing a control program for control of speed in accordance with that magnification ratio has been tedious.

SUMMARY OF THE INVENTION

The object of the present invention is therefore to provide an image forming apparatus that allows reduction in circuit board area, reduction in power consumption, and reduction in cost as a result of use of the same component as enlarging FIFO line memory and reducing FIFO line memory during variable-magnification processing in the scan direction, and to provide an image processing apparatus that allows reduction in cost and wherein neither a variable-speed-controlled motor nor a control program for this variable-speed-controlled motor is necessary as a result of the fact that variable-magnification processing is carried out without changing the speed of a scanning unit that captures image data during variable-magnification processing in the cross-scan direction.

The invention provides an image processing apparatus provided with a capability of carrying out variable magnification of image data, comprising a single FIFO memory for write/read processing of image data, a variable magnification unit for carrying out variable-magnification processing of image data based on magnification ratio, and switching means capable of switching a processing order of the write/read processing of image data carried out at the FIFO memory and the variable-magnification processing carried out at the variable magnification unit.

Such a constitution permits carrying out of the variable-magnification processing wherein the switching means is used to switch connections at the single FIFO memory and the variable magnification unit in correspondence with magnification ratio. Accordingly, by switching connections through use of the switching means, it is possible to carry out the variable-magnification processing with the single FIFO memory.

Furthermore, in the context of the foregoing constitution, it is preferable that the switching means are provided at an input terminal and output terminal of the FIFO memory, and at an input terminal and output terminal of the variable magnification unit.

In such a constitution, the switching means capable of switching the processing order of the write/read processing carried out at the FIFO memory and the variable-magnification processing carried out at the variable magnification unit are provided at the input terminal and output terminal of the FIFO memory and at the input terminal and output terminal of the variable magnification unit. Accordingly, by switching connections through use of the switching means, it is possible to carry out the variable-magnification processing with the single FIFO memory and the single variable magnification unit.

Furthermore, in the image processing apparatus of the invention it is preferable that the switching means is such that, during image enlargement, the variable-magnification processing is carried out at the variable magnification unit following write processing and read processing of image data to and from the FIFO memory, and such that, during image reduction, the write processing of image data to FIFO memory is carried out after the variable-magnification processing is carried out at the variable magnification unit.

Such a constitution permits image data written to the FIFO memory to be read and enlargement processing to be carried out at the variable magnification unit during image enlargement, and permits image data to be written to the FIFO memory after reduction processing is carried out at the variable magnification unit during image reduction. Accordingly, it is possible to carry out the variable-magnification processing without complicated processing and while using the single FIFO memory.

Furthermore, in the image processing apparatus of the invention it is preferable that the variable magnification unit comprises an enlarging variable magnification unit for carrying out variable-magnification processing following write processing and read processing of image data to and from the FIFO memory during image enlargement, and a reducing variable magnification unit for writing image data to FIFO memory after variable-magnification processing is carried out during image reduction.

Such a constitution permits variable-magnification processing to be carried out using the two variable magnification units—the enlarging variable magnification unit and the reducing variable magnification unit—, the single FIFO memory, and the switching means capable of changing processing order. Accordingly, because it is possible to carry out interpolative processing at the variable magnification unit when performing either enlargement or reduction, it is possible to carry out the variable-magnification processing such that image data is written to and read from the same FIFO memory during both enlargement and reduction.

Furthermore, the invention provides an image processing apparatus provided with a capability of carrying out variable magnification of image data, comprising a FIFO line memory for storing one line worth of image data, and a variable-magnification processing section for reading image data from the FIFO memory a number of times corresponding to magnification ratio.

Such a constitution permits variable magnification of image data to be carried out using the FIFO line memory for storing one line worth of image data and the variable-magnification processing section for reading image data a number of times corresponding to magnification ratio. Accordingly, it is possible to carry out the variable-magnification processing without altering the speed with which image data is captured despite a change in magnification ratio.

Furthermore, in the image processing apparatus of the invention it is preferable that the variable magnification unit is such that one line worth of image data written to the FIFO line memory is read a plurality of times during enlargement of image data, and image data written to the FIFO line memory is read intermittently, skipping of data occurring in units of lines, during reduction of image data.

Such a constitution permits one line worth of image data written to the FIFO memory to be read a plurality of times during enlargement, and image data written to the FIFO memory to be read intermittently during reduction. Accordingly, it is possible to carry out variable-magnification processing of image data in the cross-scan direction at a constant input speed, without altering the speed with which image data is captured, despite a change in magnification ratio.

Furthermore, the invention provides an image processing apparatus provided with a capability of carrying out variable magnification of image data, comprising a FIFO line memory for storing one line worth of image data and a variable-magnification processing section for reading image data after switching among a plurality of output lines of the FIFO memory in correspondence to magnification ratio.

Such a constitution permits a plurality of lines to be created from a single read of image data written to the FIFO memory during enlargement processing. Accordingly, it is possible to carry out enlargement processing in the cross-scan direction without altering the speed with which image data is captured.

Furthermore, in the image processing apparatus of the invention it is preferable that the image processing apparatus further comprises two FIFO line memories for respectively storing two mutually adjacent lines of image data, and variable-magnification processing is carried out at the variable-magnification processing section based on image data read from the two FIFO line memories.

In such a constitution, employment of two FIFO line memories permits interpolative processing to be carried out between adjacent lines, and makes it possible to carry out variable-magnification processing in the cross-scan direction such that image smoothness is preserved undamaged without altering mirror travel speed. Accordingly, it is possible to carry out variable-magnification processing of image data in the cross-scan direction at a constant input speed, without altering the speed with which image data is captured, despite a change in magnification ratio.

In accordance with the present invention, as a result of carrying out the variable-magnification processing by using the switching means to switch connections at a single FIFO memory and the variable magnification unit in correspondence with magnification ratio, it is possible to carry out variable-magnification processing with the single FIFO memory by switching connections through use of the switching means, permitting reduction in circuit board area, reduction in power consumption, and reduction in cost.

Moreover, in accordance with the present invention, as a result of the fact that, during image enlargement, image data written to FIFO memory is read and enlargement processing is carried out at the variable magnification unit, and as a result of the fact that, during image reduction, image data is written to the FIFO memory after reduction processing is carried out at the variable magnification unit, it is possible to carry out variable-magnification processing without complicated processing and while using the single FIFO memory.

Furthermore, in accordance with the invention, as a result of carrying out variable-magnification processing using the two variable magnification units—the enlarging variable magnification unit and the reducing variable magnification unit—, the single FIFO memory, and the switching means capable of changing processing order, because it is possible to carry out interpolative processing at the variable magnification unit when performing either enlargement or reduction, it is possible to carry out variable-magnification processing such that image data is written to and read from the same FIFO memory during both enlargement and reduction.

Furthermore, in accordance with the present invention, as a result of carrying out variable magnification of image data using the FIFO line memory that stores one line worth of image data and the variable-magnification processing section that reads image data a number of times corresponding to magnification ratio, it is possible to carry out variable-magnification processing without altering the speed with which image data is captured despite a change in magnification ratio, eliminating the need for a variable-speed-controlled motor and a control program for this motor, and permitting reduction in cost.

Furthermore, in accordance with the present invention, as a result of the fact that one line worth of image data written to FIFO memory is read a plurality of times during enlargement, and image data written to FIFO memory is read intermittently during reduction, it is possible to carry out variable-magnification processing of image data in the cross-scan direction at a constant input speed, without altering the speed with which image data is captured, despite a change in magnification ratio.

Furthermore, in accordance with the present invention, as a result of the fact that a plurality of lines are created from a single read of image data written to the FIFO memory during enlargement processing, it is possible to carry out enlargement processing in the cross-scan direction without altering the speed with which image data is captured.

Furthermore, in accordance with the invention, because employment of two FIFO line memories permits primary interpolative processing to be carried out between adjacent lines and because it is possible to carry out electronic variable-magnification processing in the cross-scan direction such that image smoothness is preserved undamaged without altering mirror travel speed, it is possible to carry out variable-magnification processing of image data in the cross-scan direction at a constant input speed, without altering the speed with which image data is captured, despite a change in magnification ratio.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
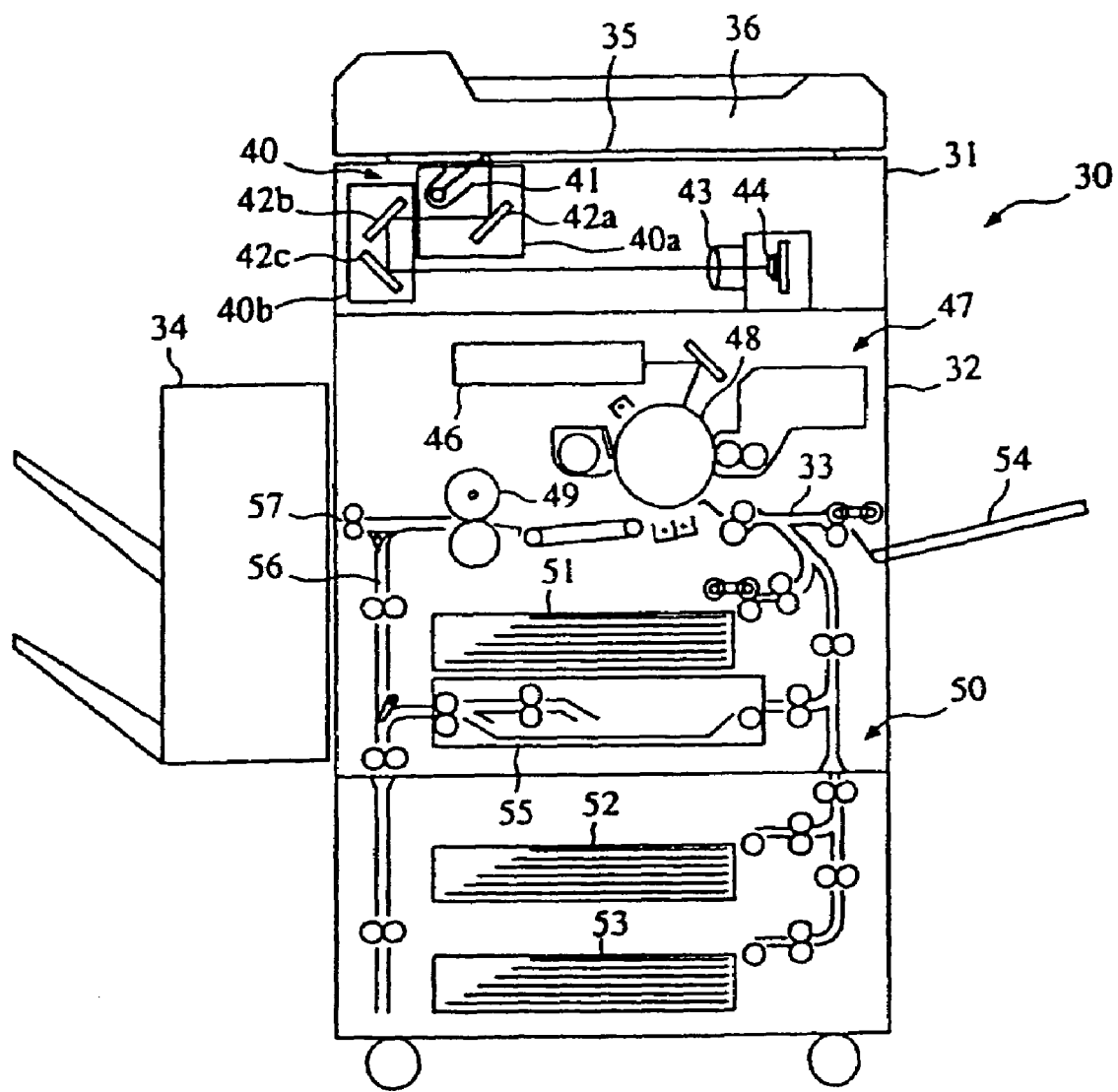
FIG. 1 is a cross-sectional view showing the overall constitution of a digital copier 30 wherein the image formation apparatus of the present invention is carried out.

Now referring to the drawings, preferred embodiments of the invention are described below.

An image formation apparatus in an embodiment associated with the present invention is a digital copier comprising, for example, a scanning section, an image processing section, and an image recording section, a communications line being connected to this digital copier.

FIG. 1 is a cross-sectional view showing the overall constitution of a digital copier 30 wherein the image formation apparatus of the present invention is carried out. The constitution of digital copier 30 can be broadly divided into a scanning section 31 and a laser recording section 32.

Scanning section 31 comprises an original loading platform 35 having a structure comprising a glass platen made of transparent glass, an automatic document feeder accommodating double-sided copying (hereinafter referred to as "RADF") 36 for automatically supplying and transporting an original to original loading platform 35, and a scanning unit 40 for scanning and capturing an image from an original loaded on original loading platform 35.

The image of the original captured by this scanning section 31 is sent as image data to an image processing section, to be described below, and prescribed image processing is performed on the image data.

RADF 36 is an apparatus wherein a plurality of sheets of originals are loaded at once on an original tray, not shown, and the loaded originals are automatically fed one sheet at a time to original loading platform 35 of scanning unit 40. Furthermore, RADF 36, in order to allow either one or both sides of an original to be captured by scanning unit 40 in accordance with selection by an operator, comprises a transport path for single-sided originals, a transport path for double-sided originals, transport path switching means, a group of sensors that apprehend and monitor the status of the original as it passes through the various subassemblies, and a control section.

Scanning unit 40 for capturing an image of an original loaded on original loading platform 35 consists of a first scanning unit 40a, whereon there are mounted a lamp reflector assembly 41 that exposes the surface of the original and a first reflecting mirror 42a that reflects light reflected from the original; a second scanning unit 40b, whereon there are mounted a second reflecting mirror 42b and a third reflecting mirror 42c that reflect the reflected image from first reflecting mirror 42a; an optical lens 43 for imaging the reflected image from the original which has been reflected by the aforementioned several reflecting mirrors 42a through 42c, and a photoelectric conversion element (hereinafter referred to as "CCD") 44 that converts the reflected image from the original into an electrical image signal.

Scanning section 31 is constructed such that as a result of associated action of RADF 36 and scanning unit 40, scanning unit 40 is made to move parallel to the lower surface of original loading platform 35 and capture images of originals as originals to be captured are sequentially loaded onto original loading platform 35. In particular, first scanning unit 40a is controlled so as to scan parallel to original loading platform 35 at a constant speed V in the cross-scan direction, and second scanning unit 40b is controlled so as to scan in the same direction and parallel thereto at a speed V/2 relative to that speed V. This action permits the image of the original which is loaded on original loading platform 35 to be sequentially imaged one line at a time onto CCD 44, capturing the image.

Image data obtained from capture of an original image by scanning unit 40 is sent to an image processing section, to be described below, where various processing is performed thereon, following which this is stored for a time in memory at the image processing section. In addition, the image in memory is read in correspondence to an output instruction and is transferred to laser recording section 32, and an image is formed on recording sheet media.

This laser recording section 32 is equipped with a sheet media transport system, sheet media being a recording material for formation of an image, a laser write unit (hereinafter referred to as "LSU") 46, and an electrophotographic processing section 47 for formation of an image. LSU 46 possesses a semiconductor laser light source that emits laser light in correspondence to image data read from memory following capture by the aforementioned scanning unit 40 or image data transferred thereto from an external device, a polygonal mirror that deflects laser light at uniform angular velocity, an f-θ lens that corrects the laser light deflected at uniform angular velocity such that it is deflected at uniform angular velocity onto a photosensitive drum 48 partially making up electrophotographic processing section 47, and so forth.

Electrophotographic processing section 47 is equipped with an electrostatic charging device, a developer, a transfer device, a separator, a cleaner, and a charge removal device arranged about the periphery of photosensitive drum 48. The sheet media transport system 50 is equipped with a transport section 33 that transports sheet media P to a transfer location at which the transfer device of the aforementioned electrophotographic processing section 47 which carries out image formation is arranged; media supply cassettes 51, 52, 53 for delivering sheet media P to transport section 33; manual media supply device 54 for supply as needed of sheet media of necessary size; fixing device 49 for fixing a toner image formed on sheet P following transfer; and resupply paths 55, 56 for resupplying sheet media P so as to again form an image on the reverse side of sheet media P following fixing. Furthermore, arranged after fixing device 49 in the media transport path is a postprocessing device 34 that performs processing such as sorting processing wherein sheet media P on which images are recorded are received and are collated into groups when a plurality of sets of copies are made on this sheet media P, stapling processing wherein media collated into groups are bound together, and the like.

At LSU 46 and electrophotographic processing section 47, image data read from image memory is formed as a latent electrostatic image on the surface of photosensitive drum 48 as a result of scanning with a laser beam by LSU 46, and the toner image, being the image which has been made visible through use of toner, is electrostatically transferred to the face of media transported from the supply section of one among a stack of several media supply units. The toner image on media on which an image is thus formed is fixed at fixing device 49 and the media is transported by way of discharge roller 57 to the interior of postprocessing device 34.

Figure 2:
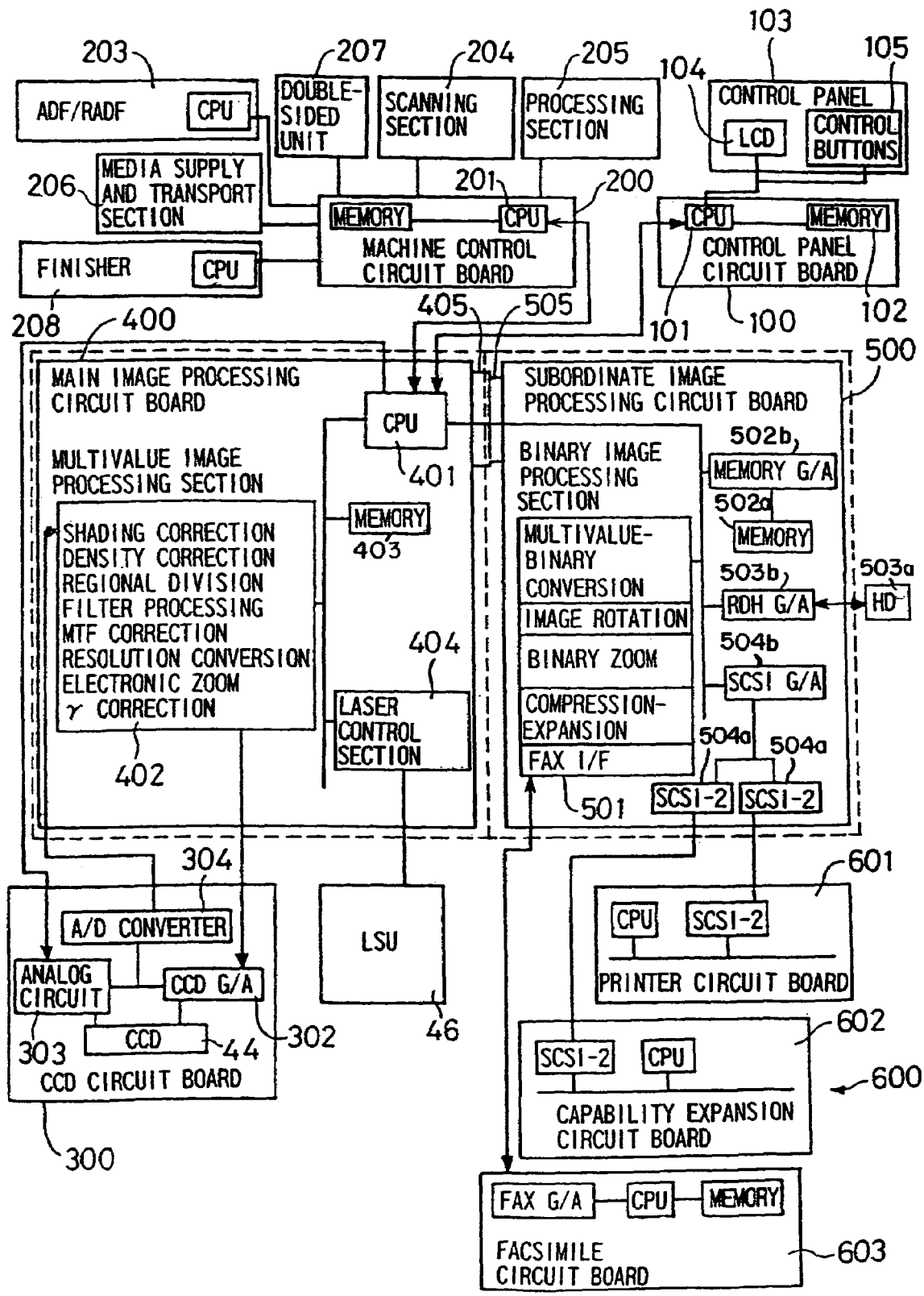
FIG. 2, being an overall block diagram of various units, image processing subassemblies, and so forth making up digital copier 30 shown in FIG. 1, is a block diagram showing a main central processing unit (hereinafter referred to as "CPU") 401 which monitors operations while cooperating with subordinate CPUs mounted at each of the several units.

FIG. 2, being an overall block diagram of various units, image processing subassemblies, and so forth making up digital copier 30 shown in FIG. 1, is a drawing showing a main central processing unit (hereinafter referred to as "CPU") 401 which monitors operations while cooperating with subordinate CPUs mounted at each of the several units.

In FIG. 2, digital copier 30 comprises a control panel circuit board 100 that monitors and controls a control panel 103; a machine control circuit board 200 that monitors and controls various units making up digital copier 30; a CCD circuit board 300 that electrically captures an original image, transforming it into digital data; a main image processing circuit board 400 that performs prescribed image processing on the image of the original made into digital data by the CCD circuit board 300; a subordinate image processing circuit board 500 that performs further prescribed image processing on the image data processed by this main image processing circuit board 400; and a group of miscellaneous extension-type circuit boards 600 (printer circuit board, facsimile circuit board, capability expansion circuit board) that are connected to the subordinate image processing circuit board 500 by way of an interface.

Below, the particulars of monitoring and control will be described separately for each circuit board.

(Control Panel Circuit Board)

The control panel circuit board 100 is fundamentally controlled by subordinate CPU 101, and monitors a display screen at LCD display section 104 arranged on control panel 103; control input from control button group 105, from which instructions for various modes are entered; and so forth. In addition, a memory 102 is provided wherein data input from control button group 105, information to be displayed on the LCD screen, and various other types of control information pertaining to the control panel is stored. The control button group will be described below in connection with FIG. 3.

In such a constitution, subordinate CPU 101 engages in control data communications with main CPU 401 and carries out operational instructions in connection with digital copier 30. Furthermore, this device is such that by transferring control signals indicating the operational status of digital copier 30 from main CPU 401 to subordinate CPU 101, operational status—what sort of state the device is currently in—can be displayed to the operator by way of LCD display section 104 of control panel 103.

(Machine Control Circuit Board)

Machine control circuit board 200 comprises subordinate CPU 201, which subordinate CPU controls an automatic original feeder 203 such as an ADF, RADF; a capturing scanning section 204 that captures an image of the original; a processing section 205 that recreates an image from image data; a media supply and transport section 206 that sequentially transports media on which an image is to be recorded from a storage section toward the processing section 205; a double-sided unit 207 that flips and transports media such that media on which an image is recorded is flipped so that an image can be formed on both sides of the media; and a finisher 208 that carries out stapling and other such postprocessing of media on which an image has been recorded.

(CCD Circuit Board)

CCD circuit board 300, control and monitoring whereof are carried out by main CPU 401, comprises a CCD 44 that captures an image of the original and converts this to analog data; a CCD gate array (shown in FIG. 2 as "CCD G/A")

302, being a circuit that drives CCD 44; an analog circuit 303 that, among other things, adjusts the gain of the analog data output from CCD 44; and an A/D converter 304 that converts the analog output from CCD 44 into a digital signal which is output as digital data.

(Main Image Processing Circuit Board)

Main image processing circuit board 400, being controlled by main CPU 401, comprises a multivalue image processing section 402 that performs shading correction, density correction, regional division, filtering, MTF (modulation transfer function) correction, resolution conversion, electronic zoom (variable-magnification processing), gamma correction, and other such processing affecting the multivalue image data while still in that form so as to produce an image having the desired density-gradation tonal quality from digital data pertaining to the original image which is sent thereto from the CCD circuit board 300; a memory 403 that stores various types of control information, such as that pertaining to the image data whereon processing has been performed or monitoring of the sequence of processing operations; a field memory that stores one page worth of an image; and a laser control section 404 that controls transfer of data to LSU 46 in order to recreate in image form the image data which has been subjected to processing.

(Subordinate Image Processing Circuit Board)

Subordinate image processing circuit board 500, being connected to main image processing circuit board 400 by a connector 505, comprises a binary image processing section 501 which is controlled by main CPU 401 on main image processing circuit board 400; a memory 502a which stores and monitors binary image information that has been subjected to image processing, control information arising in connection with processing, and the like and a gate array 502b that controls the memory 502a; a hard disk 503a for storing and monitoring a plurality of pages of original image data and for repeatedly reading a plurality of pages of original images as many times as is required to create a desired plurality of sets of copies and a gate array 503b that controls the hard disk 503a; and a small computer system interface(SCSI) circuit board 504a which serves as an external interface and a gate array 504b that controls the SCSI control board 504a. Furthermore, the binary image processing section 501 comprises a processing section capable of converting multivalue image data into a binary image, a processing section capable of rotating an image, and a binary variable-magnification processing section capable of carrying out variable-magnification processing of a binary image, and is moreover equipped with a facsimile interface (indicated as "FAX I/F" in FIG. 2) so as to permit transmission and reception of facsimile images by way of communication means.

(Extension-Type Circuit Boards)

Extension-type circuit boards 600 comprise a printer circuit board 601 for allowing data sent thereto from a personal computer or the like to be output when in printer mode from laser recording section 32 of digital copier 30; a capability expansion circuit board 602 for expanding the editing capabilities of digital copier 30 and making effective utilization of the characteristics of digital copier 30; and facsimile circuit board 603 for allowing transmission, to another party, of an original image acquired from scanning section 31 of digital copier 30, and allowing output, from the laser recording section of digital copier 30, of image data sent thereto from another party.

Below, image data processing and the flow of image data in the context of the capabilities of digital copier 30 as an image processing apparatus; that is, during the several modes—copy mode, printer mode, and facsimile mode—will be described in further detail.

(Copy Mode)

Originals placed at a prescribed location on RADF 36 of digital copier 30 are sequentially fed one sheet at a time to original loading platform 35 of scanning unit 40, images of originals are sequentially captured by scanning unit 40, described above, and are transferred as 8-bit digital data to main image processing circuit board 400. The 8-bit digital data transferred to main image processing circuit board 400 is subjected to prescribed processing as 8-bit digital image data by multivalue image processing section 402. Upon being subjected to gamma correction and other such processing, the 8-bit digital image data is sent to LSU 46 by way of laser control section 404. As a result of the foregoing processing, the original image captured by scanning section 31 of digital copier 30 is output from laser recording section 32 as a copy image having density-gradation tonal quality.

(Electronic RDH Capability in Copy Mode)

Originals placed at a prescribed location on RADF 36 of digital copier 30 are sequentially fed one sheet at a time to original loading platform 35 of scanning unit 40, images of originals are sequentially captured by the aforementioned scanning unit 40 and are transferred as 8-bit digital data to main image processing circuit board 400. The 8-bit digital data transferred to main image processing circuit board 400 is subjected to prescribed processing as 8-bit digital image data by multivalue image processing section 402. This 8-bit digital image data is then sent from connector 405 at the main image processing circuit board 400 side to subordinate image processing circuit board 500 by way of connector 505 at the subordinate image processing circuit board 500 side, and is converted from 8-bit digital image data to 2-bit digital image data, and undergoes error diffusion processing and other such processing as well, at a multivalue-binary converter section of binary image processing section 501.

Moreover, with respect to conversion of 8-bit digital image data into 2-bit digital image data incorporating error diffusion processing and other such processing, because carrying out multivalue-binary conversion alone will be problematic in terms of image quality, care is taken to minimize deterioration in of image quality. Furthermore, the fact that 8-bit digital image data is converted into 2-bit digital image data is a result of consideration of such factors as image storage capacity.

The 2-bit digital image data thus produced by conversion is transferred, in an amount corresponding to one original sheet at a time, to hard disk or other such disk memory 503a, where it is temporarily stored and monitored. When the entire set of originals placed on RADF 36 of digital copier 30 has been captured and processed, the 2-bit digital image data temporarily stored on hard disk 503a is, as a result of control by gate array 503b, repeatedly read as many times as the indicated number of sets of copies, and the 2-bit digital image data which has been read is again sent to main image processing circuit board 400 by way of connector connection regions 405 and 505, is subjected to gamma correction and other such processing, and is sent to LSU 46 by way of laser control section 404.

Moreover, whereas in the foregoing description the set of original images was repeatedly read as many times as the desired number of sets of copies after all of the images in the set of originals were captured, it is also possible for the apparatus to be constituted such that sequential output of images in the first set of copies takes place at the stage where a prescribed fraction of the images is ready.

The foregoing processing permits original images captured by scanning section 31 of digital copier 30 to be output from laser recording section 32 as copy images having density-gradation tonal quality.

(Printer Mode)

Images sent from a personal computer or other such external device connected to a network are reconstructed into images, in units of pages, at printer circuit board 601, are thereafter transferred from SCSI circuit board 504a, being an interface, to, initially, subordinate image processing circuit board 500, and, from there, are stored in hard disk 503a or other such memory.

Moreover, while images reconstructed as image pages at printer circuit board 601 are sent to subordinate image processing circuit board 500, these are merely temporarily stored in hard disk 503a without being subjected to binary image processing. Moreover, image pages are not subjected to binary image processing when image pages stored for a time on hard disk 503a are read therefrom. In addition, image data temporarily stored on hard disk 503a areas sent to main image processing circuit board 400 as they are read from hard disk 503a so as to assume a prescribed page order, gamma correction is carried out, and writing of images from laser control section 404 is controlled such that images are reproduced at LSU 46.

(Facsimile Mode)

In facsimile mode, there is processing for transmission of originals to other parties and for receipt of originals from other parties. Beginning with description of transmission of originals to other parties, originals for transmission which are placed at a prescribed location on RADF 36 of digital copier 30 are sequentially supplied one sheet at a time to original loading platform 35 of scanning unit 40, images of originals for transmission are sequentially captured by scanning unit 40, described above, and are transferred as 8-bit digital data to main image processing circuit board 400.

The 8-bit digital data transferred to main image processing circuit board 400 is subjected to prescribed processing as 8-bit digital image data by multivalue image processing section 402. This 8-bit digital image data is then sent from connector 405 at the main image processing circuit board 400 side to subordinate image processing circuit board 500 by way of connector 505 at the subordinate image processing circuit board 500 side, and is converted from 8-bit digital image data to 2-bit digital image data, and undergoes error diffusion processing and other such processing as well, at a multivalue-binary converter section of binary image processing section 501.

Moreover, with respect to conversion of 8-bit digital image data into 2-bit digital image data incorporating error diffusion processing and other such processing, because carrying out multivalue-binary conversion alone will be problematic in terms of image quality, care is taken to minimize deterioration of image quality.

As a result of the foregoing processing, originals for transmission which have been transformed into binary images are compressed according to a prescribed format and are stored in memory 502a. In addition, upon performing transmission protocols with another party and establishing a transmission-ready state, images of originals for transmission compressed according to prescribed format which have been read from memory 502a are transferred to facsimile circuit board 603, changes in compression format and other such necessary processing being carried out at this facsimile circuit board 603, and are sequentially transmitted to the other party by way of a communications line.

Next, processing of original images transmitted from another party shall be described. When originals are transmitted from another party by way of a communications line, the original images transmitted from the other party are received while communications protocols are carried out at facsimile circuit board 603, and moreover, received images in a compressed state of prescribed format are sent to binary image processing section 501 from a facsimile interface which is provided at binary image processing section 501 of subordinate image processing circuit board 500, and the original images transmitted thereto are reproduced as image pages by means of compression-expansion processing section and so forth. In addition, the original images reproduced as images in units of pages are subjected to image correction at main image processing circuit board 400, and writing of images onto recording media from laser control section 404 is controlled such that images are reproduced at LSU 46.

Figure 3:
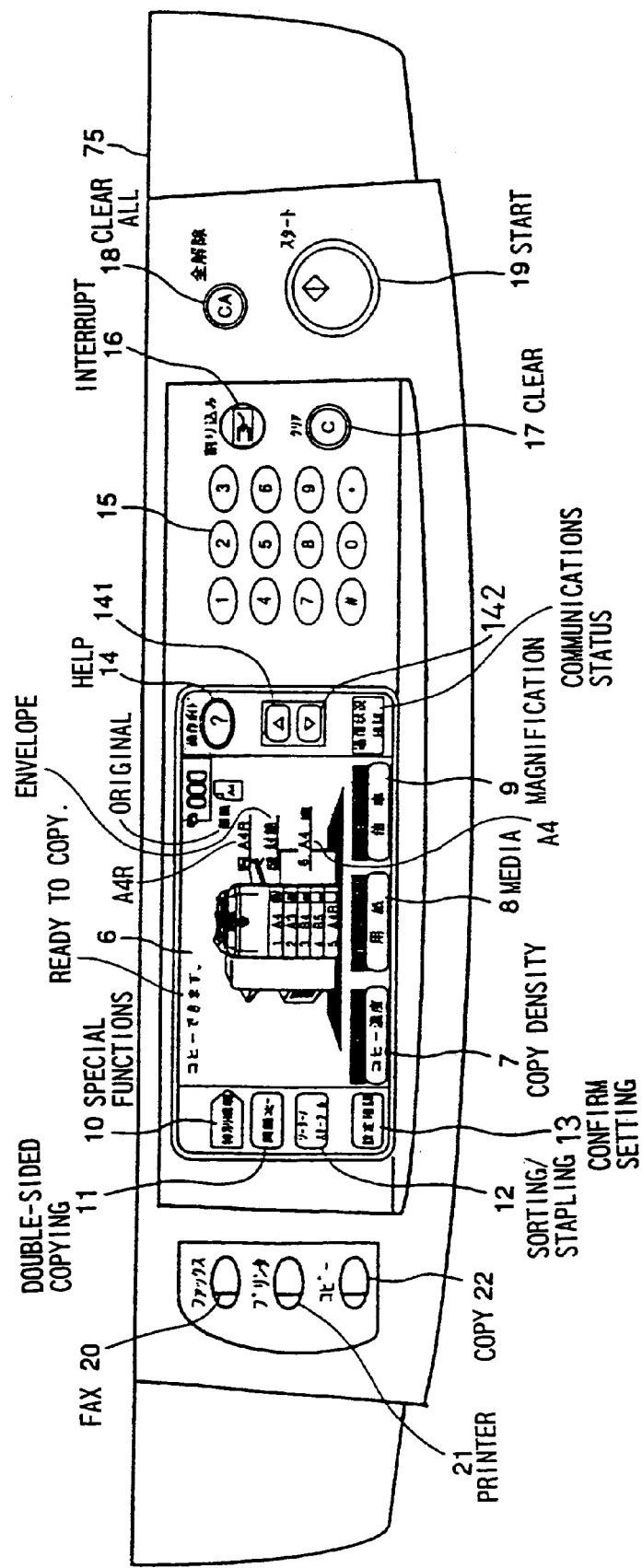
FIG. 3 is a drawing showing a control panel in a digital copier 30.

FIG. 3 is a drawing showing a control panel in a digital copier 30. Arranged within the central region of this control panel 75 is a touch-panel-type liquid crystal display device 6, and arranged at the periphery thereof is a group of various mode settings buttons. On the screen of this touch-panel-type liquid crystal display device 6 there is a display change command area that causes the display to change to a display for selection of image editing functions at any time, and using one's finger to push directly upon and activate this area causes a list of the various image editing functions to appear on the liquid crystal display so as to permit selection of the various editing functions. Editing functions are set by using one's finger to touch the region among those various editing functions at which the function desired by the operator is displayed.

Briefly describing the group of various settings buttons arranged on the control panel, actuating the button 7 for switching among copy density setting modes causes adjustment of copy density to switch from automatic to manual to photograph mode. During either manual mode or photograph mode, density level can be set in fine increments. Actuating the button 8 for switching among media tray selection modes allows selection of a desired media size from among the media set at the media supply section of the copier. Actuating the button 9 for switching among magnification setting modes allows selection among a mode setting wherein magnification is selected automatically, a mode setting wherein copy magnification can be set in 1% increments, a mode setting wherein a fixed magnification is read and selected, and a mode setting wherein copy magnification is returned to a standard magnification (100%).

Respectively provided to the left of touch-panel-type liquid crystal display device 6 are a button 10 for transferring to a special function mode, a double-sided mode setting button 11 for selecting double-sided copy mode, a postprocessing mode setting button 12 for selecting mode of operation of a postprocessing device for sorting of copies discharged from the copier, and a setting confirmation button 13 for confirming particulars of functions currently set within the special function settings. Actuating the button 10 for switching among special function modes allows selection of a binding margin setting function for forming margins at copy edges; a frame elimination function for eliminating peripheral shadows and the like; a centering function for causing copies to be more or less centered on media; an indexing function for adding indices; which is to say, reference symbols, on recording media so as to permit easy sorting during multiple copy jobs; and so forth.

Furthermore, respectively provided to the right of touch-panel-type liquid crystal display device 6 are an operation help button 14, actuation of which causes display of messages explaining how to operate the copier in the event that operation of the copier is not understood; a next message button 141 for continuing display of messages displayed as a result of actuation of operation help button 14; a previous message button 142 for returning to the next most recent message of the messages; a copy quantity setting button 15 for setting the number of copies to be made; an interrupt button 16, actuated at times during continuous copying when copying of another original is desired; a clear button 17, actuated at times when copy quantity is to be cleared or continuous copying is to be stopped during the course thereof; a clear all button 18 for returning all currently set modes to default settings; a start button 19 for indicating that copying should begin; and so forth.

Furthermore, respectively provided to the left of touch-panel-type liquid crystal display device 6 are a button 20 for transferring digital copier mode to facsimile mode, a button 21 for transferring digital copier mode to printer mode, and a button 22 transferring digital copier mode to copy mode.

The control panel and arrangement of various control buttons thereon which have been presented herein being just one particular embodiment, it goes without saying that the buttons provided on such a control panel will vary in accordance with the various functions incorporated in the digital copier.

Figure 4:
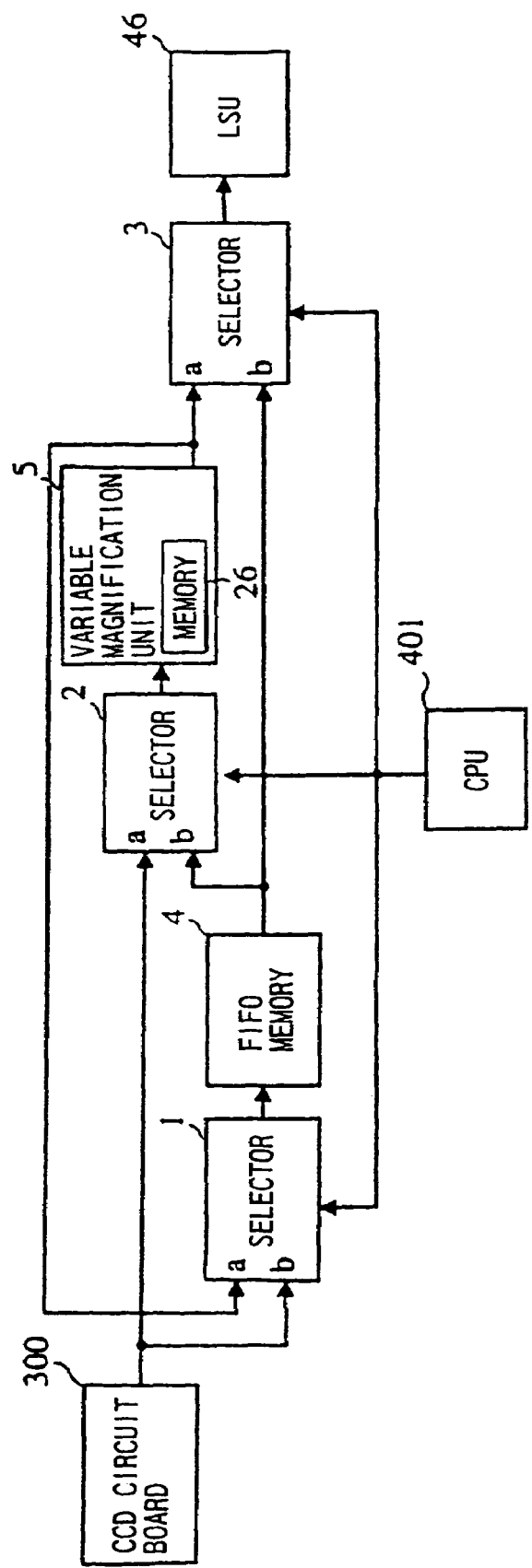
FIG. 4 is a block diagram of an image processing section in an image formation apparatus associated with a first embodiment of the present invention.

FIG. 4 is a block diagram of an image processing section in an image formation apparatus associated with a first embodiment of the present invention. The image processing section shown in FIG. 4 comprises a FIFO memory 4 for storing image data, a variable magnification unit 5 for carrying out variable-magnification processing of image data, and selector 1, selector 2, and selector 3, which represent switching means for switching connections at FIFO memory 4 and variable magnification unit 5 in accordance with magnification ratio during variable magnification of an image. Selectors 1 through 3 are variously connected to the input and output terminals of FIFO memory 4 and to the input and output terminals of variable magnification unit 5. That is, gate a of selector 1 is connected to the output terminal of variable magnification unit 5, gate b of selector 1 is connected to the output terminal of CCD circuit board 300, and the output terminal of selector 1 is connected to the input terminal of FIFO memory 4.

Furthermore, gate a of selector 2 is connected to the output terminal of CCD circuit board 300, gate b of selector 2 is connected to the output terminal of FIFO memory 4, and the output terminal of selector 2 is connected to the input terminal of variable magnification unit 5. Moreover, gate a of selector 3 is connected to the output terminal of variable magnification unit 5, gate b of selector 3 is connected to the output terminal of FIFO memory 4, and the output terminal of selector 3 is connected to the input terminal of LSU 46. As variable-magnification processing carried out at variable magnification unit 5, there is simple interpolative processing wherein the same pixel or line is read a plurality of times or is read intermittently, interpolative processing wherein a new line is formed from neighboring pixels or lines and is interpolated between pixels or lines, and so forth.

An original image acquired and output in analog fashion by CCD 44 of scanning unit 40 in FIG. 1 is converted into a digital signal at A/D converter 304 and is sent as image data from CCD circuit board 300 to main image processing circuit board 400. In addition, after the required pixel region is extracted in accordance with media size and magnification ratio at multivalue image processing section 402, variable-magnification processing takes place. Variable-magnification processing is carried out independently in the scan and cross-scan directions.

First, variable-magnification processing in the scan direction will be described. During processing to enlarge an image, CPU 401, which carries out control of the image processing apparatus, causes gate a of selector 1, gate a of selector 2, and gate b of selector 3 to be turned off, and causes gate b of selector 1, gate b of selector 2, and gate a of selector 3 to be turned on. Cropped image data are sent from CCD circuit board 300, passing through gate b of selector 1, and is thereafter written to FIFO memory 4. The image data written to FIFO memory 4 areas then read by CPU 401, passes through gate b of selector 2, and areas written to memory 26 provided at variable magnification unit 5. At variable magnification unit 5, variable-magnification processing is carried out on the image data written to memory 26. That is, image data areas read from memory 26 a plurality of times in correspondence to the enlargement ratio, changing the magnification of the image data. After completion of variable-magnification processing, the enlarged image data areas output via gate a of selector 3 to LSU unit 46.

During execution of processing to reduce an image, CPU 401 causes gate b of selector 1, gate b of selector 2, and gate a of selector 3 to be turned off, and causes gate a of selector 1, gate a of selector 2, and gate b of selector 3 to be turned on. Cropped image data are sent from CCD circuit board 300, passing through gate a of selector 2, and are input to variable magnification unit 5. At variable magnification unit 5, variable-magnification processing is carried out on the image data input thereto and image data corresponding to the reduction ratio are output therefrom. The image data on which variable-magnification processing has been carried out pass through gate a of selector 1 and are written to FIFO memory 4. Image data written to FIFO memory 4 pass through gate b of selector 3 and are output to LSU unit 46.

Variable-magnification processing in the cross-scan direction takes place by varying scan rate at scanning unit 40 in accordance with the conventional method. That is, this is executed such that, at digital copier 30 in FIG. 1, the scan rates of scanning units 40a, 40b of scanning unit 40, which capture image data, are adjusted in correspondence to magnification ratio, increasing or decreasing the number of lines acquired by CCD circuit board 300 from CCD 44. For example, reduction is achieved by increasing the rate at which image data are captured and reducing the number of lines per unit time acquired by CCD circuit board 300. Furthermore, enlargement is achieved by decreasing the rate at which image data are scanned and increasing the number of lines per unit time acquired by CCD circuit board 300. Following adjustment of input line number as a result of increase or decrease of scanning unit 40a, 40b travel speed, the image data are input to the FIFO memory for scan-direction variable-magnification processing, and after being subjected to scan-direction variable-magnification processing, are either output to LSU unit 46 or is written to field memory 403.

In this way, whereas two FIFO memories—a FIFO memory for enlargement and a FIFO memory for reduction—were required in order to carry out variable-magnification processing conventionally, the present invention permits variable-magnification processing to be carried out using a single FIFO memory and without complicating the sequence of processing operations.

Figure 5:
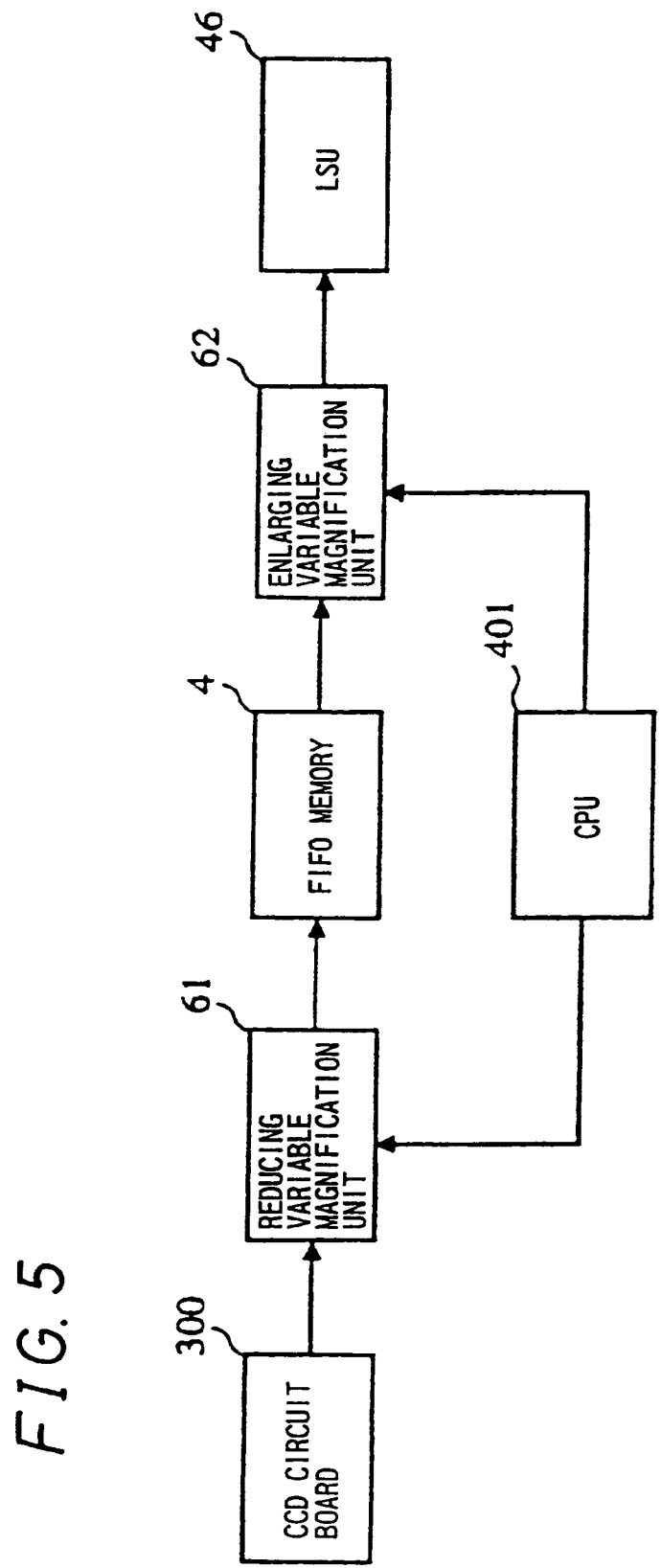
FIG. 5 is a block diagram of an image processing section in an image formation apparatus associated with a second embodiment of the present invention.

FIG. 5 is a block diagram of an image processing section in an image formation apparatus associated with a second embodiment of the present invention. The image processing section shown in FIG. 5 comprises a reducing variable magnification unit 61, which, with respect to variable magnification of image data, carries out reduction processing; a FIFO memory 4 that stores image data; an enlarging variable magnification unit 62, which, with respect to variable magnification of image data, carries out enlargement processing; and a CPU 401 that switches inputs at reducing variable magnification unit 61 and enlarging variable magnification unit 62. The input terminal of reducing variable magnification unit 61 is connected to the output terminal of CCD circuit board 300, the input terminal of FIFO memory 4 is connected to the output terminal of reducing variable magnification unit 61, the input terminal of enlarging variable magnification unit 62 is connected to the output terminal of FIFO memory 4, and the output terminal of enlarging variable magnification unit 62 is connected to the input terminal of LSU 46. Furthermore, reducing variable magnification unit 61 and enlarging variable magnification unit 62 receive control signals from CPU 401. Variable-magnification processing is carried out independently in the scan and cross-scan directions.

First, variable-magnification processing in the scan direction will be described. During execution of processing to enlarge an image, control signals are sent from CPU 401 such that despite input of image data to reducing variable magnification unit 61, image data is allowed to pass therethrough without being subjected to variable-magnification processing. These control signals cause reducing variable magnification unit 61 to allow image data to pass therethrough despite input thereat. Cropped image data travels from CCD circuit board 300, passing through reducing variable magnification unit 61, and are written to FIFO memory 4. In addition, at enlarging variable magnification unit 62, image data are read from FIFO memory 4 and are variably magnified in correspondence to enlargement ratio, and are thereafter output to LSU 46.

During execution of processing to reduce an image, control signals are sent from CPU 401 such that despite input of image data to enlarging variable magnification unit 62, image data are allowed to pass therethrough without being subjected to variable-magnification processing. These control signals cause enlarging variable magnification unit 62 to allow image data to pass therethrough despite input thereat. Cropped image data are input from CCD circuit board 300 to reducing variable magnification unit 61. The image data are subjected to pixel interpolation and other such variable-magnification processing at reducing variable magnification unit 61, are thereafter written to FIFO memory 4, pass through enlarging variable magnification unit 62, and are output to LSU 46.

During execution of processing to reduce an image, control signals are sent from CPU 401 such that despite input of image data to enlarging variable magnification unit 62, image data is allowed to pass therethrough without being subjected to variable-magnification processing. These control signals cause enlarging variable magnification unit 62 to allow image data to pass therethrough despite input thereat. Cropped image data is input from CCD circuit board 300 to reducing variable magnification unit 61. The image data is subjected to pixel interpolation and other such variable-magnification processing at reducing variable magnification unit 61, is thereafter written to FIFO memory 4, passes through enlarging variable magnification unit 62, and is output to LSU 46.

Figure 12A:
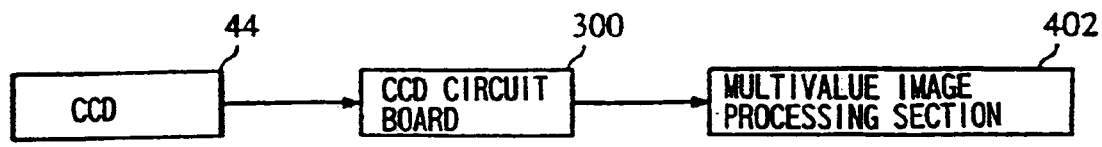
FIGS. 12A through 12C are block diagrams showing a sequence of operations for variable-magnification processing in the cross-scan direction.
Figure 12B:
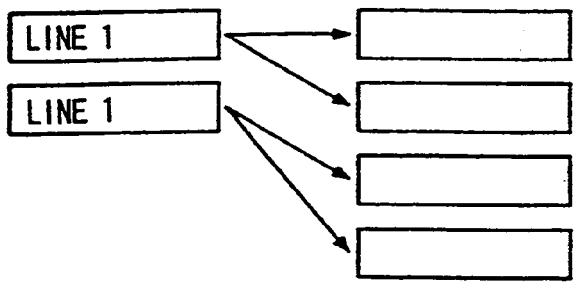
Figure 12C:
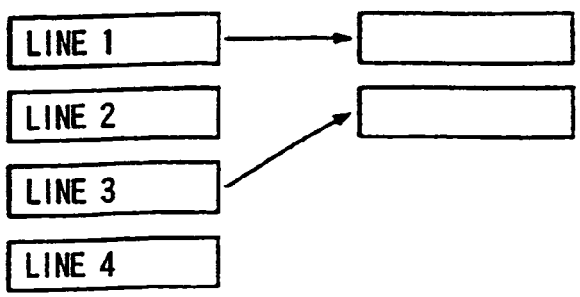

Moreover, at FIFO memory, in order to prevent write addressing and read addressing from passing one another, the start locations for the FIFO memory 4 write enable signal and the read enable signal are made variable in correspondence to magnification ratio. Overtaking of addressing as used here refers to outstripping of either writing or reading by the other in mid-operation at FIFO memory 4 due to the fact that one is occurring at a faster rate than the other when carrying out enlargement or reduction. For example, if read addressing is overtaking write addressing, then there will be attempts to read undefined data that has not yet been written, with negative consequences. If write addressing is overtaking read addressing, then data being read will become different data in mid-operation, with negative consequences, because of new data being written thereto. Therefore, by causing the write signal for FIFO memory 4 to start earlier than the read signal therefor during enlargement, and causing the read signal for FIFO memory 4 to start earlier than the write signal therefor during reduction, there will be no occurrence of overtaking of addressing, and there will be no transposition in the lines of image data written to FIFO memory 4. With respect to variable-magnification processing in the cross-scan direction, this is carried out in accordance with the conventional method described with reference to FIG. 12.

In this way, as a result of provision of a reducing variable magnification unit 61 and an enlarging variable magnification unit 62, variable-magnification processing can be carried out using a single FIFO memory and in accordance with the sequence of processing operations of the conventional method, and the need for two memories—an enlarging FIFO memory and a reducing FIFO memory—as was the case conventionally, is eliminated.

Figure 6:
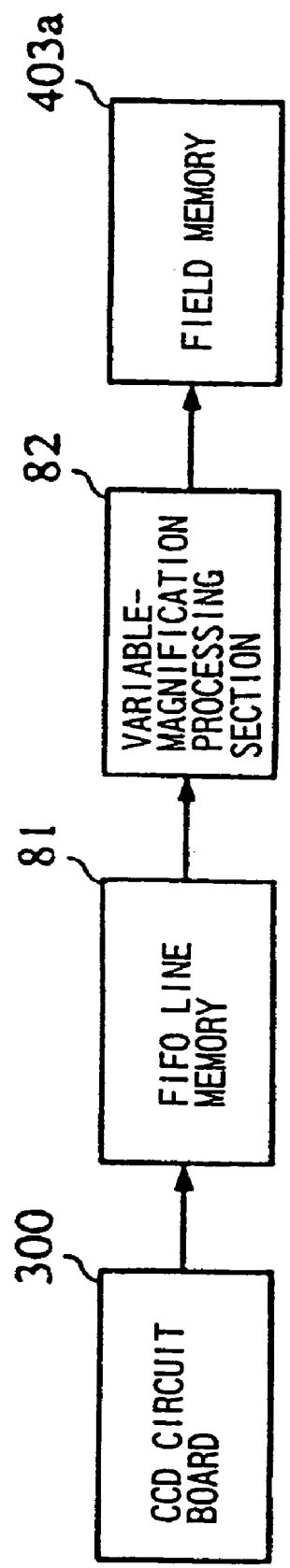
FIG. 6 is a block diagram of an image processing section in an image formation apparatus associated with a third embodiment of the present invention.

FIG. 6 is a block diagram of an image processing section in an image formation apparatus associated with a third embodiment of the present invention. The image processing section shown in FIG. 6 comprises a FIFO line memory 81 that stores one line worth of image data, and a variable-magnification processing section 82 that reads image data a number of times corresponding to magnification ratio. The input terminal of FIFO line memory 81 is connected to the output terminal of CCD circuit board 300, the input terminal of variable-magnification processing section 82 is connected to the output terminal of FIFO line memory 81, and the output terminal of variable-magnification processing section 82 is connected to the input terminal of field memory 403a. Variable-magnification processing is carried out independently in the scan and cross-scan directions. Variable-magnification processing in the scan direction is the same as the processing which was described with reference to FIG. 4.

Variable-magnification processing in the cross-scan direction will now be described. At FIG. 6, during execution of processing to enlarge an image, image data captured by CCD circuit board 300, described with reference to FIG. 2, are sent to multivalue image processing section 402 of main image processing circuit board 400, and are written to FIFO line memory 81, which is internal to multivalue image processing section 402. One line worth of image data written to FIFO line memory 81 is read a plurality of times by variable-magnification processing section 82 as a result of FIFO line memory 81 read address resetting. For example, if one line worth of image data written to FIFO line memory 81 is read twice by variable-magnification processing section 82, image data which has been enlarged by a factor of two will be obtained. The image data which have been read are written to field memory 403a.

Furthermore, during execution of processing to reduce an image, a plurality of lines of image data written to FIFO line memory 81 is read intermittently by variable-magnification processing section 82. For example, if the first line of image data written to FIFO line memory 81 is read by variable-magnification processing section 82, but then the second line of image data written to FIFO line memory 81 is not read thereby, image data which have been reduced by a factor of ½ will be obtained. The image data which have been read are written to field memory 403a.

Image data for which variable-magnification processing in the cross-scan direction has been completed is passed to the scan-direction image processing section which was described with reference to FIG. 4 and is subjected to variable-magnification processing.

In this way, whereas image data scan rate was conventionally varied in correspondence to magnification ratio, adjustment of the number of times that image data is read in the cross-scan direction permits variable-magnification processing to be carried out such that image data are captured at a constant scan rate.

Furthermore, at FIG. 6, during execution of enlargement processing, if, at variable-magnification processing section 82, the field memory 403a write address select signal is controlled, and control is such that image data written to FIFO line memory 81 are written at one time to a plurality of lines in correspondence to magnification ratio, the image data will become image data which are enlarged in correspondence to magnification ratio. That is, image data gotten by CCD circuit board 300 of FIG. 2 are input to multivalue image processing section 402, and are written to FIFO line memory 81 within multivalue image processing section 402. Variable-magnification processing section 82 controls the field memory 403a write address select signal, and one line worth of image data written to FIFO line memory 81 is written to a plurality of lines in field memory 403a at one time. For example, by writing the same one line to three lines, enlargement processing of magnification 3× is carried out.

Figure 7:
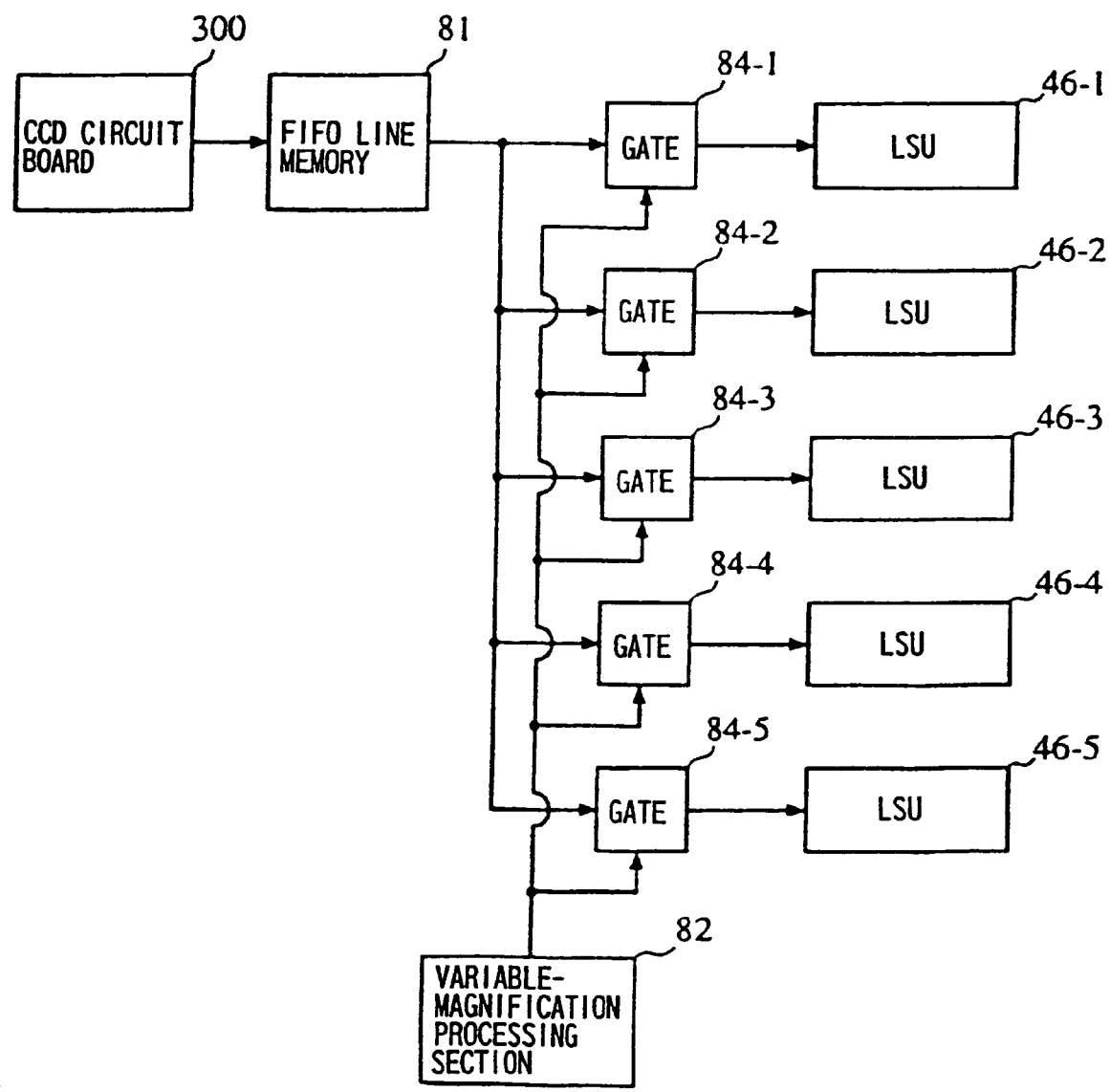
FIG. 7 is a block diagram of another embodiment, showing an example of a variable-magnification processing method different from that described at FIG. 6.

FIG. 7 is a view showing a fourth embodiment of a variable-magnification processing method different from that described at FIG. 6. The fourth embodiment, shown in FIG. 7, comprises a FIFO line memory 81 that stores one line worth of image data, a variable-magnification processing section 82 that reads image data in correspondence to magnification ratio, and LSUs 46-1 through 46-5 that write image data on a photosensitive drum 48. The input terminals of LSUs 46-1 through 46-5 are respectively connected to output terminal of FIFO line memory 81. Furthermore, gates 84-1 through 84-5 are respectively provided between FIFO line memory 81 and LSUs 46-1 through 46-5, flow of image data being controlled by means of control signals from variable-magnification processing section 82.

In the variable-magnification processing method shown in FIG. 7, enlargement processing can be carried out up to a maximum magnification of 5×. When executing enlargement processing, image data captured by CCD circuit board 300 are sent to multivalue image processing section 402 of main image processing circuit board 400 of FIG. 2, and are written from multivalue image processing section 402 to FIFO line memory 81. Variable-magnification processing section 82 sends control signals to gates 84-1 through 84-5 in correspondence to magnification ratio, carrying out on/off control of the gates. One line worth of image data written to FIFO line memory 81 is output at one time to LSUs 46-1 through 46-5 in correspondence to the on and off states of gates 84-1 through 84-5.

For example, when performing enlargement processing of magnification 5×, variable-magnification processing section 82 turns on gates 84-1 through 84-5. In addition, image data written to FIFO line memory 81 are output to LSUs 46-1 through 46-5. Furthermore, when performing enlargement processing of magnification 3×, because variable-magnification processing section 82 turns off gates 84-4 and 84-5, image data are not sent to LSUs 46-4 and 46-5. Accordingly, the same one line of image data is output to LSUs 46-1 through 46-3.

That is, variable-magnification processing section 82 controls gates 84-1 through 84-5 of the data lines connecting FIFO line memory and LSUs 46-1 through 46-5, so that image data written to FIFO line memory 81 are written at one time to a plurality of lines in correspondence to magnification ratio, which causes the image data to become image data which are enlarged in correspondence to magnification ratio. In this way, whereas image data scan rate was conventionally varied in correspondence to magnification ratio, adjustment of the number of times that image data are read in the cross-scan direction permits image data to be captured at a constant scan rate.

Figure 8:
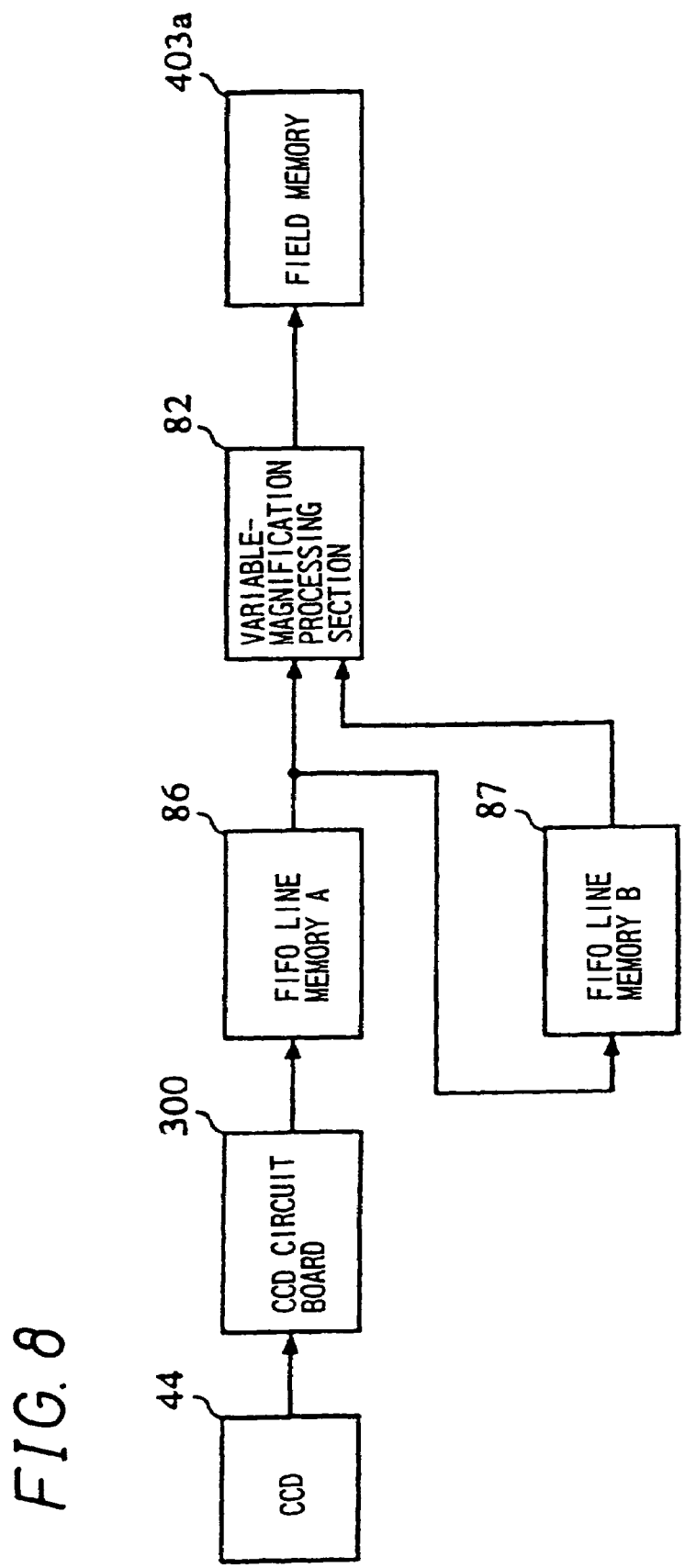
FIG. 8 is a block diagram of an image processing section in an image formation apparatus associated with a fifth embodiment of the present invention.

FIG. 8 is a block diagram of an image processing section in an image formation apparatus associated with a fifth embodiment of the present invention. The image processing section shown in FIG. 8 comprises a FIFO line memory A 86 and a FIFO line memory B 87, which store image data, and a variable-magnification processing section 82 that reads image data written to FIFO line memory A 86 and FIFO line memory B 87 and carries out variable-magnification processing of image data. The input terminal of FIFO line memory A 86 is connected to the output terminal of CCD circuit board 300, and the output terminal of FIFO line memory A 86 is connected to variable-magnification processing section 82. Furthermore, the input terminal of FIFO line memory B 87 is connected to the output terminal of FIFO line memory A 86, and the output terminal of FIFO line memory B 87 is connected to the input terminal of variable-magnification processing section 82. Moreover, the output terminal of variable-magnification processing section 82 is connected to the input terminal of field memory 403a. Variable-magnification processing is carried out independently in the scan and cross-scan directions.

Variable-magnification processing in the cross-scan direction will now be described. During execution of enlargement processing, of the plurality of lines worth of image data sent from CCD circuit board 300, the first line of image data captured by CCD 44 is written to FIFO line memory A 86. Next, the second line of image data captured by the CCD is written to FIFO line memory A 86. At this time, the first line of image data which was written to FIFO line memory A 86 is read from FIFO line memory A 86 and is written to FIFO line memory B 87. Moreover, the third line of image data is written to FIFO line memory A 86, overwriting the contents thereof. At this time, the second line of image data which was written to FIFO line memory A 86 is read from FIFO line memory A 86 and is written to FIFO line memory B 87. In the event that there is more image data, the foregoing processing is continuously carried out.

Figure 9A:
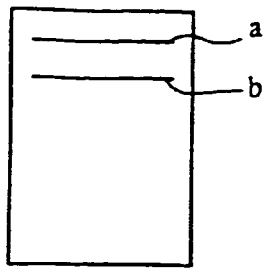
FIGS. 9A through 9E are drawings showing the sequence of operations for carrying out enlargement when the original being captured contains two lines of image data: line a and line b.

In a situation, for example as shown in FIG. 9A, where there are two lines of image data—line a and line b—in the image data to be captured on the original, the sequence of operations for carrying out enlargement might be as follows.

Figure 9B:
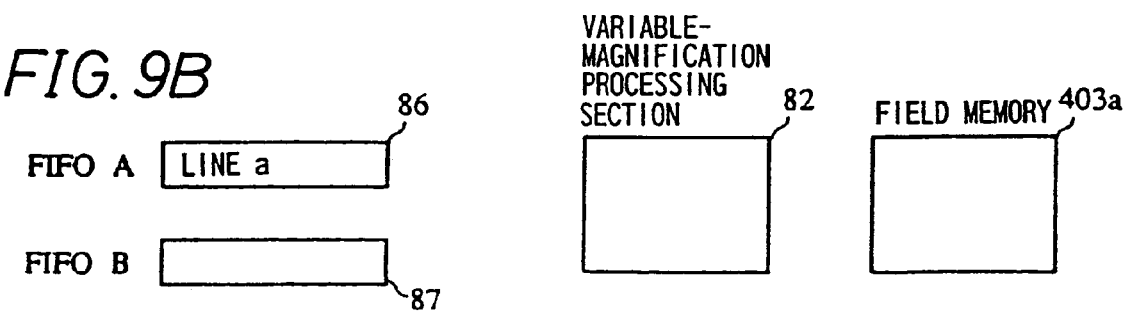

(1) As shown in FIG. 9B, the image data at line a are written to FIFO line memory A 86.

Figure 9C:
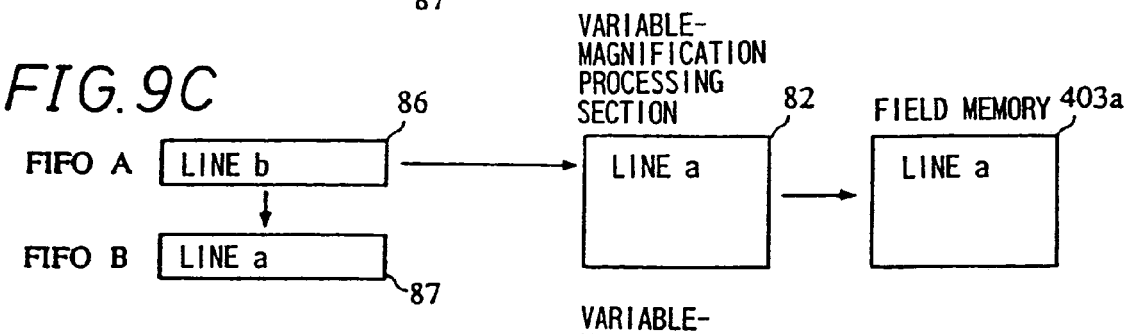

(2) As shown in FIG. 9C, the line-a image data are read by variable-magnification processing section 82. At the same time, the line-a image data are also written to FIFO line memory B 87. Variable-magnification processing section 82 writes the line-a image data read from FIFO line memory A 86 to field memory 403*a*.

Figure 9D:
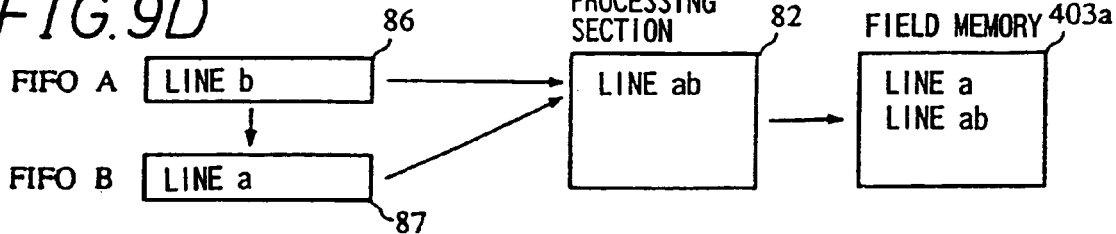

(3) As shown in FIG. 9D, the image data at line b are written to FIFO line memory A 86, and variable-magnification processing section 82 reads the line-a image data written to FIFO line memory B 87 and the line-b image data written to FIFO line memory A 86. At the same time, the line-b image data is also written to FIFO line memory B 87. Variable-magnification processing section 82 performs interpolation on line a and line b, creating a new line ab, which it writes to field memory 403*a*.

Figure 9E:
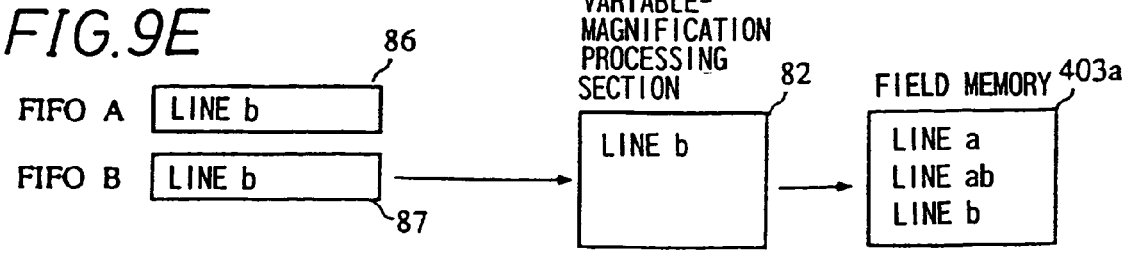

(4) As shown in FIG. 9E, variable-magnification processing section 82 reads the line-b image data written to FIFO line memory B 87, which it writes to field memory 403*a*.

As a result of the foregoing enlargement processing, line-a, line-ab, and line-b image data are written to field memory 403*a*. In the event that there a plurality of lines of image data on the original to be captured, the foregoing processing is repeated as necessary to enlarge the original image by a factor of two.

Figure 10A:
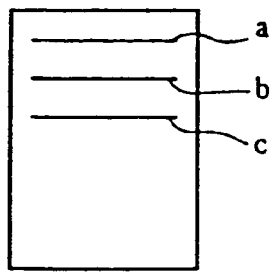
FIGS. 10A through 10E are drawings showing the sequence of operations for carrying out reduction when the original being captured contains three lines of image data: line a, line b, and line c.

Furthermore, in a situation as shown in FIG. 10A where there are three lines of image data—line a, line b, and line c—in the image data on the original to be captured, the sequence of operations for carrying out reduction might be as follows.

Figure 10B:
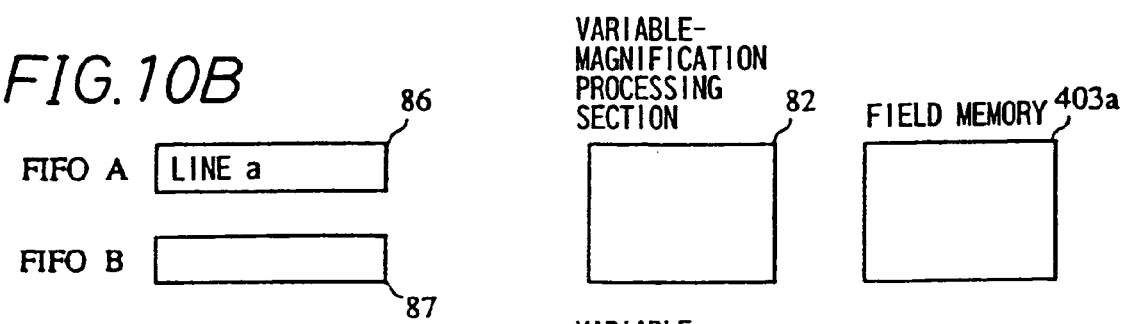

(1) As shown in FIG. 10B, the image data at line a are written to FIFO line memory A 86.

Figure 10C:
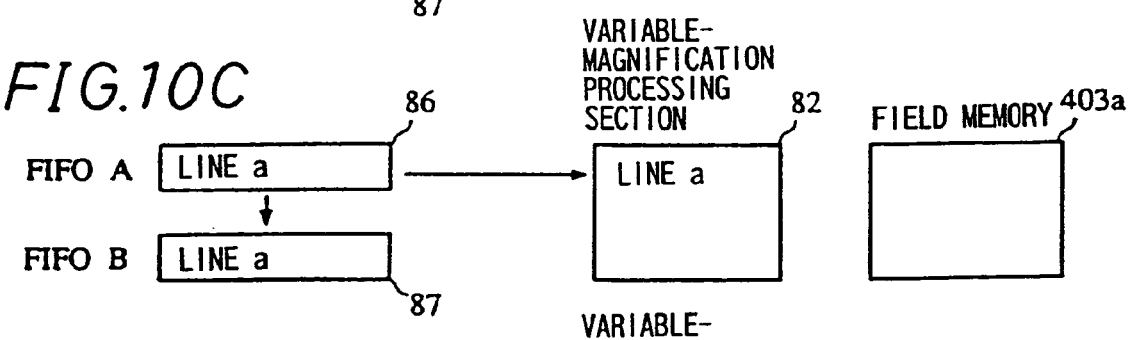

(2) As shown in FIG. 10C, variable-magnification processing section 82 reads the line-a image data. At the same time, the line-a image data are also written to FIFO line memory B 87. Variable-magnification processing section 82 does not write the line-a image data read from FIFO line memory A 86 to field memory 403*a*.

Figure 10D:
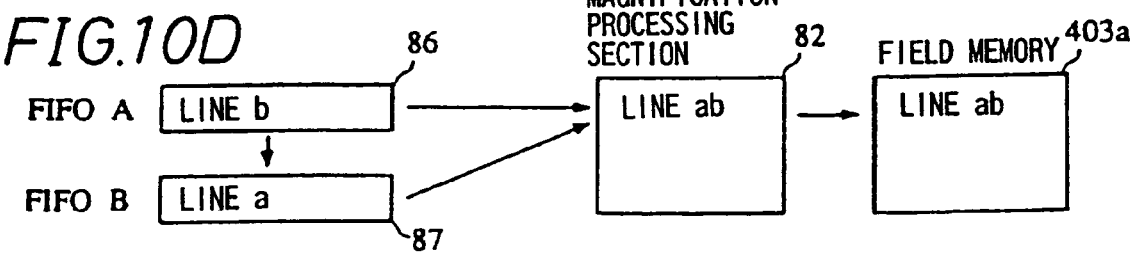

(3) As shown in FIG. 10D, the image data at line b are written to FIFO line memory A 86, and variable-magnification processing section 82 reads the line-a image data written to FIFO line memory B 87 and the line-b image data written to FIFO line memory A 86. At the same time, the line-b image data are also written to FIFO line memory B 87. Variable-magnification processing section 82 performs interpolation on line a and line b which it read, creating a new line ab, which it writes to field memory 403*a*.

Figure 10E:
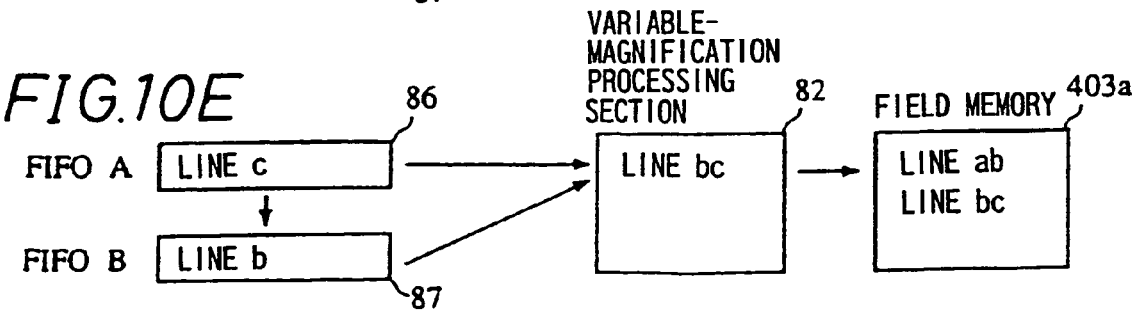
Figure 11:
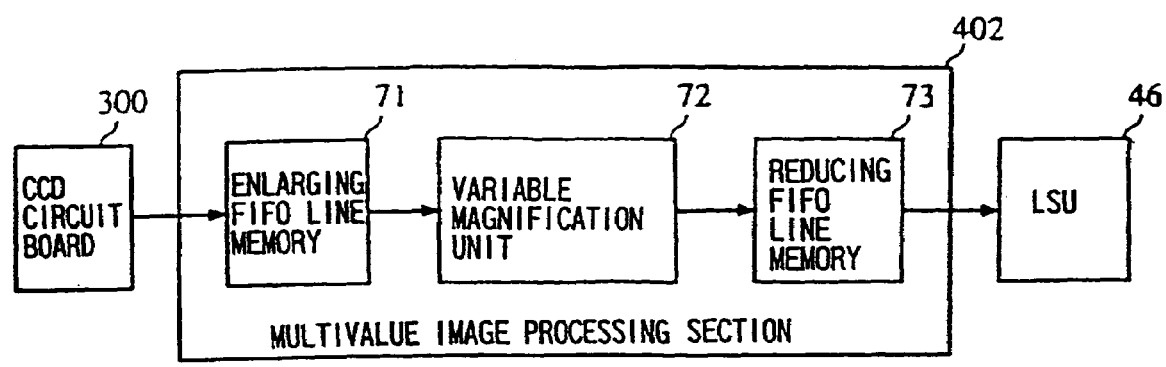
FIG. 11 is a block diagram showing a sequence of operations for variable-magnification processing in the scan direction.

(4) As shown in FIG. 10E, the image data at line c are written to FIFO line memory A 86. Variable-magnification processing section 82 reads the line-b image data written to FIFO line memory B 87 and the line-c image data written to FIFO line memory A 86. At the same time, the line-c image data are also written to FIFO line memory B 87. Variable-magnification processing section 82 performs interpolation on line b and line c which it read, creating a new line bc, which it writes to field memory 403*a*.

As a result of the foregoing reduction processing, line-ab and line-bc image data are written to field memory 403*a*. In the event that there is a plurality of lines of image data on the original to be captured, the foregoing processing is repeated to reduce the original image by a factor of ½.

Carrying out processing as in the foregoing example permits interpolative processing to be carried out between adjacent lines and permits image smoothness to be preserved, with the rate at which image data is captured being kept constant, even when magnification ratio is made extremely large. Image data for which variable-magnification processing in the cross-scan direction has been completed are passed to the scan-direction image processing section which was described with reference to FIG. 4.

In this way, whereas image data scan rate was conventionally varied in correspondence to magnification ratio, adjustment of the number of times that image data is read in the cross-scan direction permits image data to be captured at a constant scan rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processing apparatus provided with a capability of carrying out variable magnification of image data, comprising:

a single first-in, first-out memory for carrying out write/read processing of image data;

an enlarging variable magnification unit for carrying out enlarging variable-magnification processing following write processing and read processing of image data to and from the single first-in, first-out memory during image enlargement; and a reducing variable magnification unit for carrying out reducing variable-magnification processing, the reducing variable magnification unit writing image data to the single first-in, first-out memory after reducing variable-magnification processing is carried out during image reduction, wherein the enlarging variable magnification unit and the reducing variable magnification unit are separate units which read image data from and/or write image data to the same single first-in, first-out memory.

2. An image processing apparatus provided with a capability of carrying out variable magnification of image data, comprising:

a line memory for storing one line worth of the image data;

a plurality of image forming means;

a plurality of output lines for connecting the line memory and the plurality of image forming means;

a plurality of switching means for turning the plurality of output lines on or off individually; and a variable-magnification processing means for increasing and decreasing a number of the image forming means to which one line worth of the image data is outputted by increasing and decreasing a number of the turning-on switching means by on/off-controlling the switching means in correspondence to magnification ratio, wherein each of the plurality of output lines from the line memory is connected in parallel to the plurality of image forming means.

3. The image processing apparatus of claim 1, wherein an enlarging variable magnification processing in a scan direction is carried out independently of an enlarging variable magnification processing in a sub-scan direction or a reducing variable magnification processing in a scan direction is carried out independently of a reducing variable magnification processing in a sub-scan direction.

4. The image processing apparatus of claim 1, wherein a write signal for the first-in, first-out memory is started earlier than a read signal therefor when the variable magnification processing is an enlargement, and the read signal for the first-in, first-out memory is started earlier than the write signal therefor when the variable magnification processing is a reduction.

5. The image processing apparatus of claim 2, wherein an enlarging variable magnification processing in a scan direction is carried out independently of an enlarging variable magnification processing in a sub-scan direction or a reducing variable magnification processing in a scan direction is carried out independently of a reducing variable magnification processing in a sub-scan direction.

\* \* \* \* \*